(12) United States Patent
Watanabe et al.

(10) Patent No.: US 6,519,836 B2
(45) Date of Patent: Feb. 18, 2003

(54) BOLT PRESS FIT APPARATUS

(75) Inventors: Toshihiro Watanabe, Osaka (JP); Osamu Nakai, Osaka (JP)

(73) Assignee: Toyo Tire & Rubber Co., Ltd, Osaka (JP)

( * ) Notice: Subject to any disclaimer, the term of this patent is extended or adjusted under 35 U.S.C. 154(b) by 104 days.

(21) Appl. No.: 09/775,511

(22) Filed: Feb. 2, 2001

(65) Prior Publication Data

US 2002/0078557 A1 Jun. 27, 2002

(30) Foreign Application Priority Data

Dec. 26, 2000 (JP) ........................................ 2000-394135

(51) Int. Cl.[7] .......................... B23P 19/00; B23P 19/06; B23P 21/00
(52) U.S. Cl. ...................... 29/714; 29/564.1; 29/281.4; 29/430; 81/54; 81/57.37
(58) Field of Search ..................... 29/563, 564, 564.1, 29/711, 714, 798, 809, 813, 251, 281.1, 281.3, 281.4, 281.6, 430; 7/165; 81/54, 57.36, 57.37, 435

(56) References Cited

U.S. PATENT DOCUMENTS

| | | | | |
|---|---|---|---|---|
| 3,929,176 A | * | 12/1975 | Dixon | |
| 3,960,191 A | * | 6/1976 | Murray | |
| 4,542,576 A | * | 9/1985 | Yamanaga et al. | |
| 5,123,158 A | * | 6/1992 | Dixon | |
| 5,291,645 A | * | 3/1994 | Aoyama | |
| 5,619,788 A | * | 4/1997 | Schmidt | |
| 5,974,660 A | * | 11/1999 | Muller | |

FOREIGN PATENT DOCUMENTS

| | | | |
|---|---|---|---|
| DE | 3416344 | * | 11/1985 |
| DE | 4301284 | * | 10/1993 |
| JP | 08-071868 | * | 3/1996 |

* cited by examiner

Primary Examiner—Gregory M. Vidovich
Assistant Examiner—Eric Compton
(74) Attorney, Agent, or Firm—Jordan and Hamburg LLP

(57) ABSTRACT

A bolt press fit apparatus comprising; a bolt press fit press machine, a hardware mounting members which can move between a press position of the bolt press fit press machine and a retracted position separated from this press position, and which has a predetermined number of bolt-insertion holes into which bolts are press fitted, bolt transfer mechanisms, and bolt temporarily-press fit mechanisms which insert and temporarily press fit the bolts from the bolt transfer mechanism in a corresponding manner with respect to the predetermined number of bolt-insertion holes.

15 Claims, 6 Drawing Sheets

# BOLT PRESS FIT APPARATUS

BACKGROUND OF THE INVENTION

1. Field of the Invention

The present invention relates to a bolt press fit apparatus, and for instance, to a bolt press fit apparatus used for press fit a bolt into a strut mount hardware that is an automobile part.

2. Description of the Related Art

For example, a strut mount that is an automobile part is produced in the following manner:

1) A plurality of bolts are inserted into a plurality of bolt-insertion holes formed in a strut mount hardware.
2) A bolt press fit member is press fitted into the bolt-insertion hole by a bolt press fit press machine ("press machine", hereinafter).
3) An unvulcanized rubber composition is vulcanized and adhered to the strut mount hardware.

Conventionally, the bolt press fit apparatus for press fitting a bolt into the bolt-insertion hole of the strut mount hardware only comprises the above-described bolt press fit machine.

An operator mounts one strut mount hardware to a table of the press machine, individually inserts the bolts into the bolt-insertion holes of the strut mount hardware, and operates the press machine to press fit the bolts.

According to a structure of the above prior art, since the operator individually inserts the bolts into the bolt-insertion holes of the strut mount hardware, there are problems that it is hard work to insert the bolts, the operational efficiency is inferior, and a load of the operator is high.

Although the above prior art was described while taking the case of the strut mount hardware, another type of hardware having the bolt-insertion holes into which the bolts are press fitted also has the same problems.

SUMMARY OF THE INVENTION

In view of the above problems of the prior art, it is an object of the present invention to provide a bolt press fit apparatus in which efficiency of the operation for press fitting a bolt into a bolt-insertion hole of hardware can be enhanced, and labor of an operation can be reduced.

To achieve the above object, according to the present invention, there is provided a bolt press fit apparatus comprising a bolt press fit press machine, a hardware mounting members which can move between a press position of the bolt press fit press machine and a retracted position separated from this press position, and which has a predetermined number of bolt-insertion holes into which bolts are press fitted, bolt transfer mechanisms, and bolt temporarily-press fit mechanisms which insert and temporarily press fit the bolts from the bolt transfer mechanism in a corresponding manner with respect to the predetermined number of bolt-insertion holes.

According to this structure, the bolt temporarily press fit mechanisms provided in correspondence to the predetermined number of insertion holes of the hardware receive the bolts from the bolt transfer mechanisms individually, and each bolt is inserted and temporarily press fitted into the bolt insertion hole of the hardware mounted to the hardware mounting portion on the side of the retracted position.

In this case, since the bolt is temporarily press fitted into the bolt insertion hole by the temporarily press fit mechanism, it is possible to prevent the attitude of the bolt with respect to the hardware from being deviated when the hardware mounting portion is displaced.

Next, the press machine is operated at the press position to finally press fit the bolt into the bolt insertion hole of the hardware.

Since the bolt is press fitted into the bolt insertion hole in this manner, it is possible to enhance the efficiency of operation to press fit the bolt into the bolt insertion hole of the hardware, and to reduce the labor of the operation as compared with the conventional apparatus in which the bolts are individually inserted into the bolt insertion holes.

It is preferable that the bolt temporarily-press fit mechanism is provided with a guide for guiding the bolt from the bolt transfer mechanism, and a bolt holding portion for holding the bolt from the guide with a urging force of urging means from outside in a diametrical direction of the bolt temporarily-press fit mechanism, and a guiding direction of the guide is inclined with respect to an axial direction of the bolt held by the bolt holding portion.

Further, it is preferable that the bolt temporarily-press fit mechanism includes a press and drive portion which presses the bolt held by the bolt holding portion to discharge the bolt from the bolt holding portion against the urging force of the urging means, and temporarily press fits the bolt in the bolt-insertion hole.

With this structure, the guide of the bolt temporarily press fit mechanism supplies the bolts from the bolt transfer mechanism to the bolt holding portion.

The bolt holding portion holds the bolt with the urging force of the urging means from outside in the diametrical direction.

Then, the press and drive portion presses the bolt held by the bolt holding portion to discharge the bolt from the bolt holding portion against the urging force of the urging means, and temporarily press fits the bolt in the bolt-insertion hole.

Since the guiding direction of the guide is inclined with respect to the axial direction of the bolt held by the bolt holding portion, the bolt can reach the bolt holding portion without interfering with the press and drive portion.

Therefore, it is possible to further enhance the efficiency of the operation to press fit the bolt into the bolt insertion hole of the hardware, and to further reduce the labor of the operator.

It is preferable that the hardware mounting members functions as a support portion for supporting the hardware such that the hardware can rotated around its axis.

It is preferable that the hardware mounting members includes a fitting projection which loosely fits into a recess formed at a central portion of the hardware, and a flange receiving portion on which a flange of the hardware is placed.

It is preferable that the press and drive portion comprises a fluid pressure cylinder and a bolt-pressing rod connected to the fluid cylinder.

It is preferable that the press and drive portion allows the pressing rod to function as a positioning rod for the hardware, and before the bolt from the bolt transfer mechanism is received in the bolt holding portion, the press and drive portion projects the pressing rod from the bolt holding portion, and inserts the pressing rod into the bolt-insertion hole of the hardware on the side of the hardware mounting member so that the hardware can be positioned with respect to the bolt holding portion.

The hardware mounting portion supports the hardware such that the hardware can rotate around its axis, and before the bolt from the bolt transfer mechanism is received in the bolt holding portion, the press and drive portion projects the pressing rod from the bolt holding portion, and inserts the pressing rod into the bolt-insertion hole of the hardware on the side of the hardware mounting member.

When the bolt-insertion hole of the hardware is deviated in position with respect to the bolt holding portion, the hardware receives a force around the axis from the press rod and rotate around the axis so that the deviation is corrected.

Therefore, it is possible to further enhance the efficiency of the operation to press fit the bolt into the bolt insertion hole of the hardware, and to further reduce the labor of the operator, and the bolt can be press fitted into the bolt insertion hole without deviating the attitude of the bolt.

DETAILED DESCRIPTION OF THE PREFERRED EMBODIMENT

An embodiment of a bolt press fit apparatus according to the present invention will be explained in detail with reference to the drawings.

Figure 1:
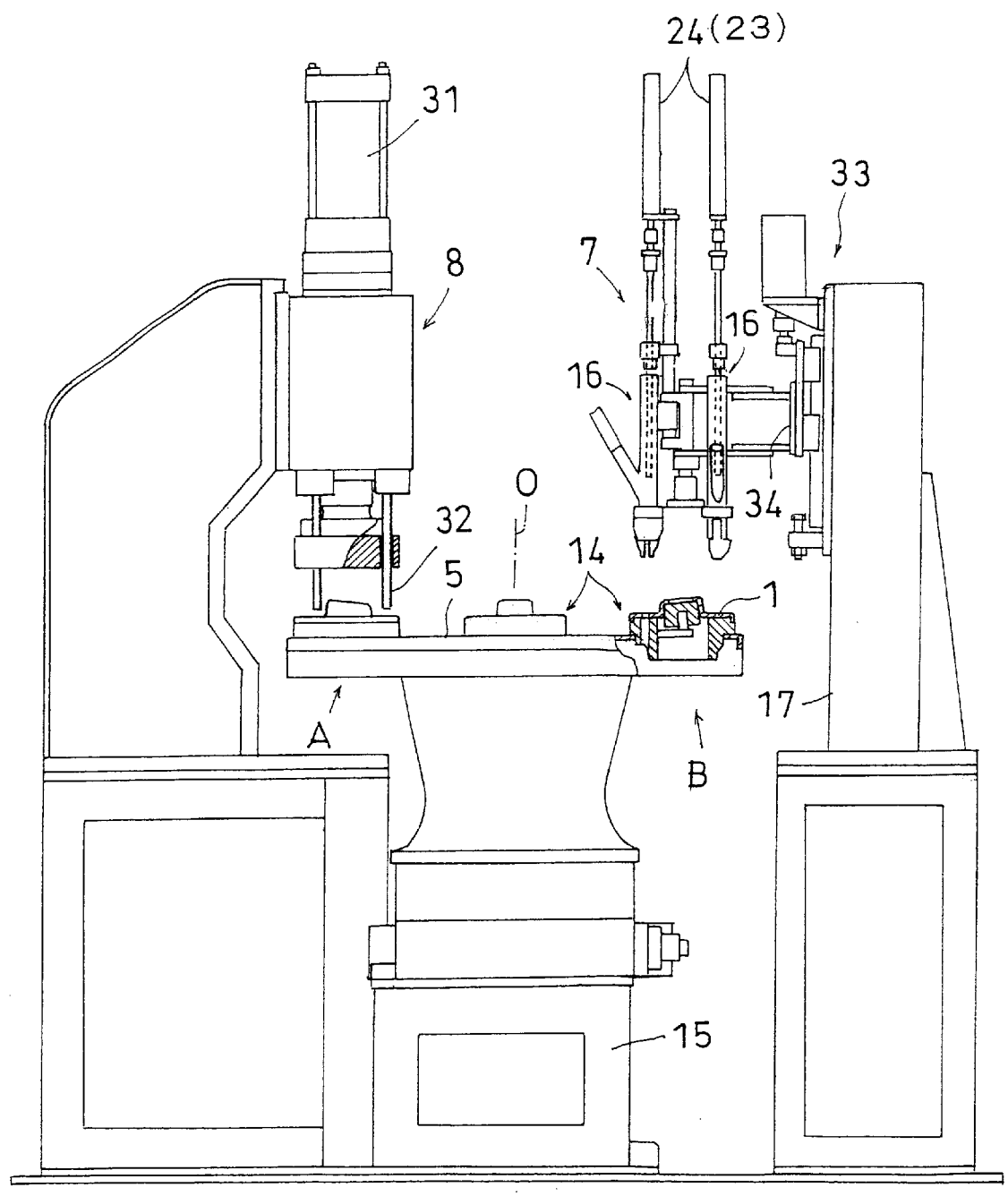
FIG. 1 is a front view of a bolt press fit apparatus according to an embodiment of the present invention.
Figure 2:
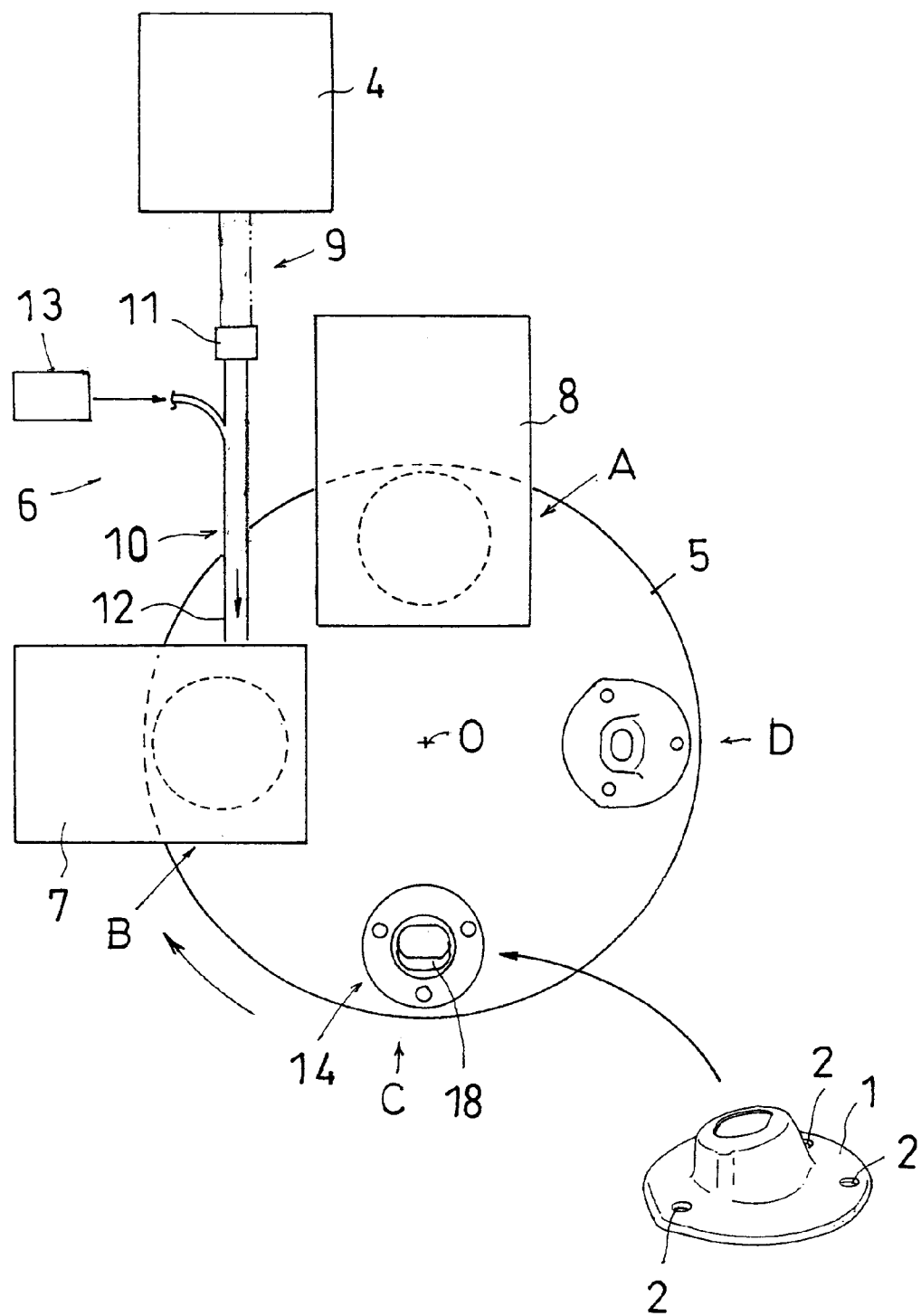
FIG. 2 is a plan view of the bolt press fit apparatus shown in FIG. 1.
Figure 6:
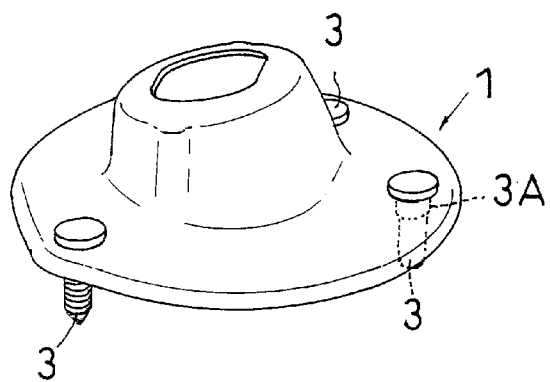
FIG. 6 is a perspective view of a strut mount hardware into which the bolt was press fitted.

FIGS. 1 and 2 show the bolt press fit apparatus for inserting and press fitting a bolt 3 into each of a plurality of bolt-insertion holes 2 of a strut mount hardware 1 which is one example of hardware. The bolt 3 is formed into a shape that a neck portion 3A (see FIG. 4) located lower than a head thereof is slightly larger in diameter than body portion of the bolt 3, and the large diameter portion is knurled. This knurled diameter portion ("press fit portion 3A", hereinafter) is press fitted into the bolt-insertion hole 2. FIG. 6 shows a state in which the bolts 3 are individually inserted and press fitted into the bolt-insertion holes 2 of the strut mount hardware 1 by the bolt press fit apparatus.

This bolt press fit apparatus comprises a bolt supply portion 4, a bolt transfer mechanism 6, a bolt temporarily-press fit device 7, and a bolt press fit press machine 8 ("press machine 8", hereinafter). The bolt supply portion 4 accommodates a large number of bolts 3. The bolt transfer mechanism 6 transfers the bolts 3 of in the bolt supply portion 4 to the bolt temporarily-press fit device 7.

This bolt temporarily-press fit device 7 temporarily inserts and press fits the bolts 3 received from the bolt transfer mechanism 6 into the bolt-insertion holes 2 of the strut mount hardware 1 individually. Then, the bolt press fit press machine 8 finally press fits the temporarily press fitted bolts 3.

[Bolt Transfer Mechanism]

The bolt transfer mechanism 6 comprises a first transfer section 9 (so-called "part-feeder) for flowing down the bolt 3 through a transfer path by its own weight, and a second transfer section 10 for sending the bolt from the first transfer section 9 by air pressure.

The first transfer section 9 is constituted such that the bolt 3 flows down in its axial direction in the first half of the transfer path, and the bolt 3 flows down in the latter half in a state in which a head of the bolt 3 is directed upward. A bolt-length detecting sensor 11 for detecting whether the bolt 3 has a predetermined length is provided at an end of the transfer path of the first transfer section 9.

The second transfer section 10 includes a tube 12 for allowing the bolt 3 to flow, and a compressor 13 for supplying compressed air into the tube 12.

[Temporarily Press Fitting Device]

The temporarily press fit device 7 includes a circular table 5 which is rotatable around a center axis O and vertically movably supported on a base 15, and a plurality of bolt temporarily press fit mechanisms 16 vertically movable provided on an apparatus body 17 through a hoisting and lowering mechanism 33. The bolt temporarily press fit mechanisms 16 respectively correspond to the plurality of bolt-insertion holes 2 of the strut mount hardware 1.

The circular table 5 includes four hardware mounting members 14 for mounting the strut mount hardware 1. The hardware mounting members 14 are disposed around the center axis at equal distances from one another.

The bolt temporarily press fit mechanisms 16 insert and temporarily press fit the bolts 3 from the bolt transfer mechanism 6 into the bolt-insertion holes 2 of the strut mount hardware 1 mounted to the hardware mounting members 14.

Each of the hardware mounting members 14 includes a fitting projection 18 which is loosely fitted into a recess formed in a central portion of the strut mount hardware 1, and a flange receiving portion 19 on which a flange of the strut mount hardware 1 is placed. That is, the hardware mounting member 14 functions as a support member for allowing the strut mount hardware 1 to rotate around a hardware axis P.

The circular table 5 intermittently rotates around the center axis O through 90° by 90°. When the circular table 5 is stopped, one hardware mounting member 14 is located at a press position A of the bolt press fit press machine 8. The other three hardware mounting members 14 are respectively located at a bolt temporarily press fit position B (corresponding to a retreated position) of the temporarily press fit device 7, a supply position C of the strut mount hardware 1, and a paint position D which will be described latter from upstream in the rotational direction of the circular table 5.

The hardware mounting member 14 can move from the press position A of the bolt press fit press machine 8 to the temporarily press fit position B separated from the press position A.

Figure 3:
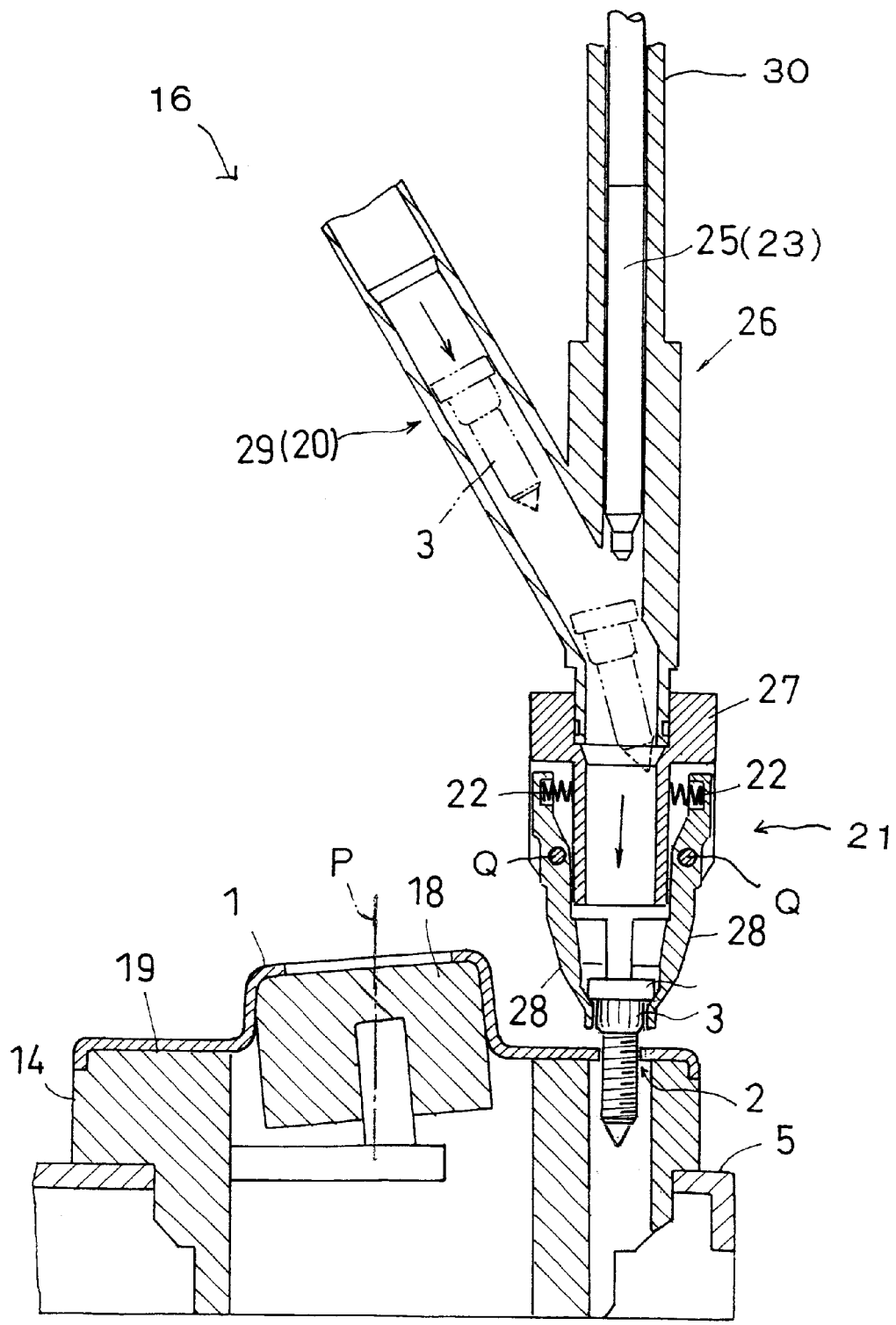
FIG. 3 is a vertical sectional view showing a bolt press fit mechanism constituting the bolt press fit apparatus shown in FIG. 1.
Figure 4:
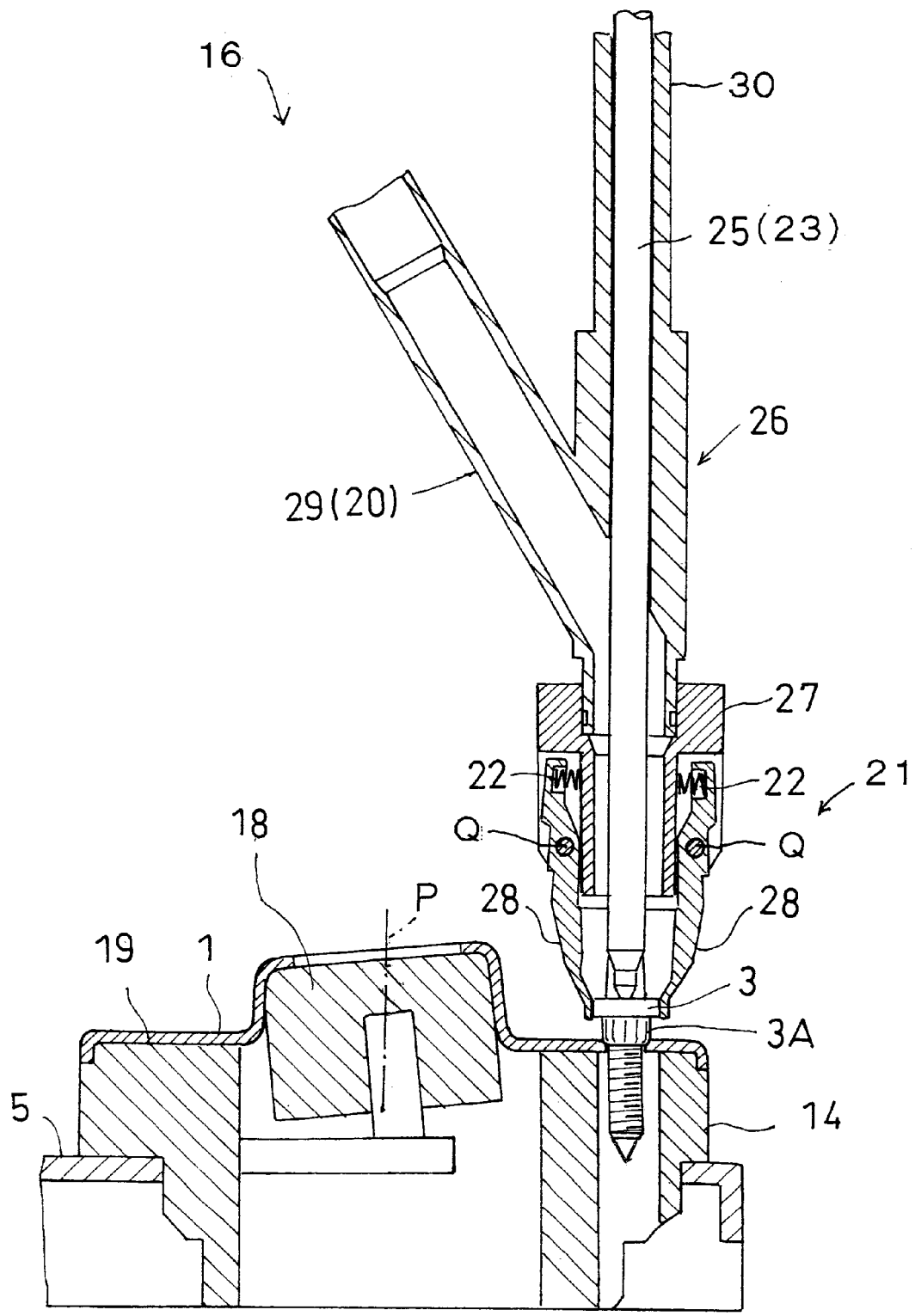
FIG. 4 is a vertical sectional view showing the bolt press fit mechanism shown in FIG. 3.

As shown in FIGS. 3 and 4 also, each of the bolt temporarily press fit mechanisms 16 comprises a hollow cylindrical bolt guide 20, a bolt holding portion 21, and a press and drive portion 23.

The bolt guide 20 receives the bolt 3 from the bolt transfer mechanism 6. The bolt guide 20 comprises a first hollow tube portion 29 which is one of V-shaped bifurcated hollow tubes 26 closer to the apparatus body 17 and supported by a hoisting and lowering frame 34. That is, a tip end of the tube 12 of the bolt transfer mechanism 6 is connected to an upper end of the first hollow tube portion 29. The other one of the tube portions, i.e., second hollow tube portion 30 stands vertically.

The bolt holding portion 21 comprises a chuck body 27 fitted around a lower end of the first hollow tube portion 29, and a pair of claws 28 which can be opened and closed around an upper transverse axis Q. The claws 28 are biased in their closing direction by springs 22 (corresponding to urging means) That is, the bolt holding portion 21 holds the bolt 3 from the bolt guide 20 by a urging force of the springs 22 from outside in its diametrical direction.

Figure 7A:
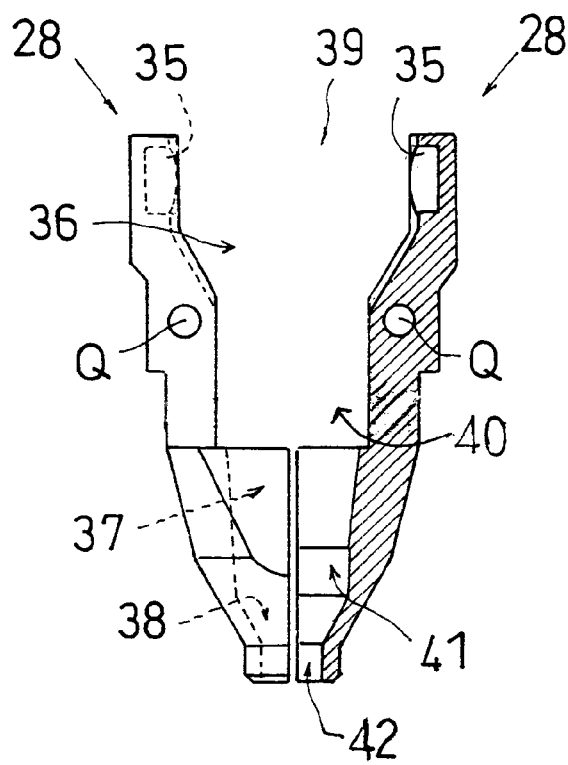
FIGS. 7(a) to 7(d) are diagrams showing claws constituting the bolt press fit mechanism.
Figure 7B:
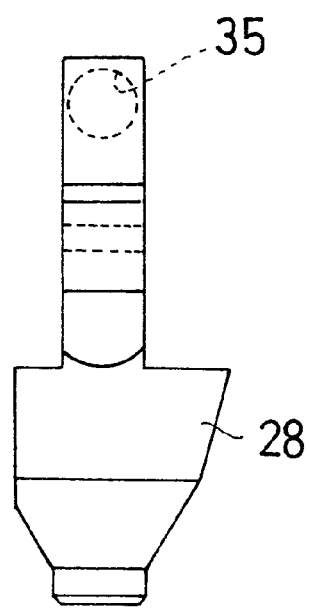
Figure 7C:
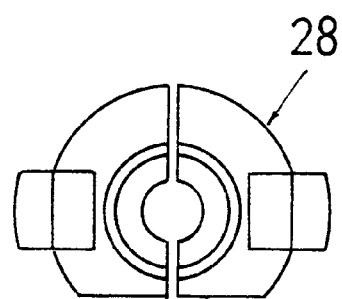
Figure 7D:
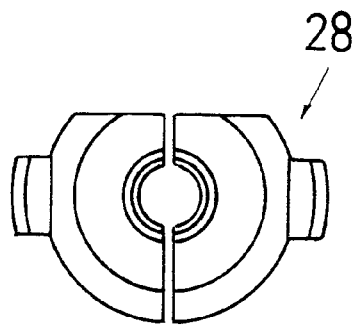

FIGS. 7(a) to 7(d) shows the pair of claws 28. FIG. 7(a) is a partially cutaway front view of the pair of claws 28. FIG. 7(b) is a rear view of the claws 28, FIG. 7(c) is a view of the pair of claws 28 as viewed from their rear ends, and FIG. 7(d) is a view as viewed from tip ends of the claws 28.

The pair of claws 28 are formed such that a tapered cylindrical body is divided into two pieces in the diametrical direction, and large diameter portions of the divided cylindrical bodies are cut flatly.

As shown in FIG. 7(a), a hollow portion of the cylindrical body comprises spaces 39, 40, 41 and 42 each having uniform diameter, and a plurality of tapered spaces 36, 37 and 38 respectively located between the former spaces. In FIGS. 7(a) and (b), reference number 35 represent spring accommodating holes 35.

As described above, the bolt guide 20 and the bolt holding portion 21 are set such that a guide direction of the bolt guide 20 is inclined with respect to the axial direction of the bolt 3 held by the bolt holding portion 21.

The press and drive portion 23 presses the bolt 3 held by the bolt holding portion 21, discharges the bolt from the bolt holding portion 21 against the urging force, and temporarily press fits the bolt into the bolt-insertion hole 2.

The press and drive portion 23 allows the hoisting and lowering frame 34 closer to the apparatus body 17 to support a vertical air cylinder 24 (corresponding to a fluid pressure cylinder) which is coaxial with the second hollow tube portion 30. A bolt-pressing rod 25 which is hoisted and lowered in the hollow portion of the second hollow tube portion 30 is connected to the air cylinder 24.

The bolt-pressing rod 25 is also used as a positioning rod of the strut mount hardware 1. That is, before the bolt holding portion 21 receives the bolt 3 from the bolt transfer mechanism 6, the bolt-pressing rod 25 is projected from the bolt holding portion 21 by the expansion driving force of the air cylinder 24 so that the bolt-pressing rod 25 is inserted into the bolt-insertion hole 2 of the strut mount hardware 1.

When the bolt-insertion hole 2 of the strut mount hardware 1 is deviated in position from the bolt holding portion 21, the strut mount hardware 1 receives a force from the pressing rod 25 around the hardware axis P and rotates around the latter, and the deviation in position is corrected.

The press machine 8 is of a known structure, and detailed explanation of the structure will be omitted.

The bolt press fit apparatus of the above structure press fits the bolt 3 into the bolt-insertion hole 2 of the strut mount hardware 1 in the following order:

1) The strut mount hardware 1 is mounted to the hardware mounting members 14 of the circular table 5 of the temporarily press fit device 7 located at the supply position C of the strut mount hardware 1. At that time, the bolt temporarily press fit mechanisms 16 is located at a hoisted position.

2) The circular table 5 is rotated through 90° and the hardware mounting members 14 is positioned at the temporarily press fit position B (in this case, another hardware mounting members 14 adjacent to the former hardware mounting members 14 is positioned at the supply position C, but the hardware mounting members 14 positioned at the supply position C is subjected to the same operation as that of the 1). That is whenever the hardware mounting members 14 is located at the supply position C, the same operation as that of the 1) is carried out).

3) The bolt temporarily press fit mechanism 16 is lowered by the hoisting and lowering mechanism 33. The pressing rod 25 is projected from the bolt holding portion 21 by the expansion driving force of the air cylinder 24 and is inserted into the bolt-insertion hole 2 of the strut mount hardware 1, and the strut mount hardware 1 is positioned with respect to the bolt holding portion 21.

4) The pressing rod 25 is hoisted and retracted by the shrinking driving force of the air cylinder 24.

5) The bolt 3 is supplied to the bolt holding portion 21 by the bolt transfer mechanism 6.

6) The pressing rod 25 is lowered by the expansion driving force of the air cylinder 24 of the temporarily press fit device 7, and the bolt 3 in the bolt holding portion 21 is pressed. Then, the bolt 3 is inserted into the bolt-insertion hole 2 of the strut mount hardware 1, and the press fit portion 3A of the bolt 3 is temporarily press fitted into the bolt-insertion hole 2.

7) The pressing rod 25 is hoisted and retracted by the shrinking driving force of the air cylinder 24.

8) The bolt temporarily press fit mechanisms 16 is hoisted by the hoisting and lowering mechanism 33. The circular table 5 is rotated through 90°, and the hardware mounting members 14 is positioned at the press position A of the press machine 8.

Figure 5:
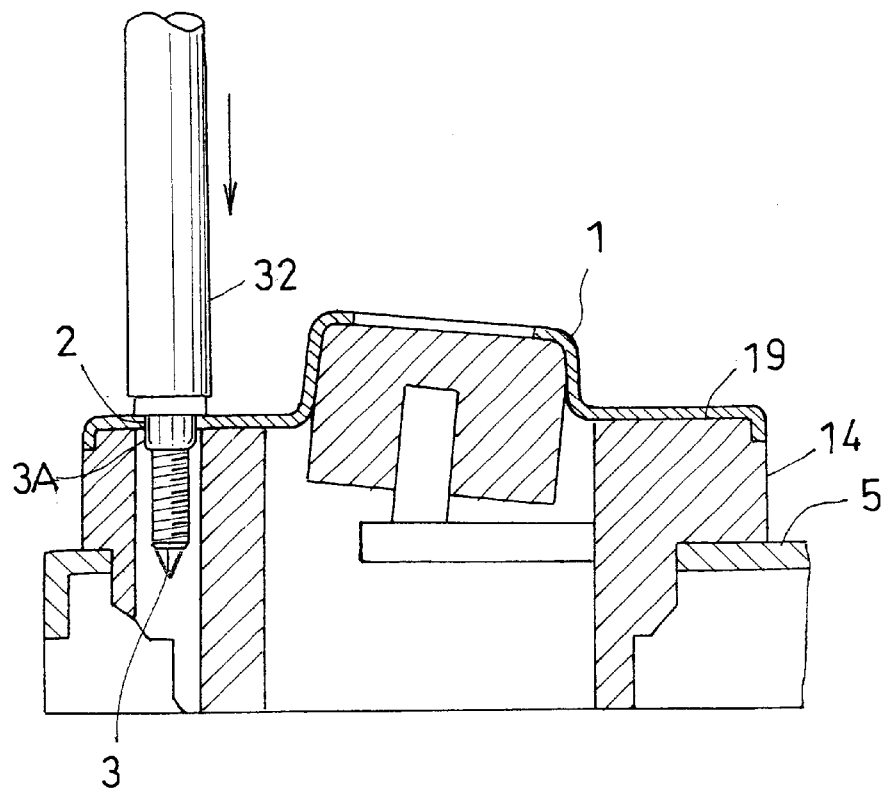
FIG. 5 is a diagram showing a press fit state of a bolt by a press machine.

9) The press fit portion 3A of the bolt 3 is finally press fitted into the bolt-insertion hole 2 by the press machine 8 (see FIG. 5). A reference number 32 represents a press rod of the press machine in FIG. 5.

10) In the strut mount hardware 1, the central recess and the through holes are provided on the right side or left side with respect to the center of the plurality of bolt insertion holes. It is difficult to judge whether the central recess and the through holes are provided on the right side or left side at first glance. Therefore, after the step 9), the circular table 5 is rotated through 90°, the hardware mounting members 14 is positioned at the paint position D, and the strut mount hardware 1 is painted with a predetermined color.

By painting the strut mount hardware 1 in this manner, it is possible to swiftly judge whether the central recess and the through holes are provided on the right side or left side.

11) The circular-table 5 is rotated through 90°, the hardware mounting members 14 is positioned at the supply position C, and the strut mount hardware 1 is collected form the hardware mounting members 14.

[Another Embodiment]

The hardware 1 is not limited to the strut mount hardware, and it may be of another type only if the hardware includes the bolt-insertion hole 2 through which the bolt 3 is press fitted.

What is claimed is:

1. A bolt press fit apparatus for inserting bolts into hardware comprising:
a bolt press fit press machine,
hardware mounting members which can move between a press position of said bolt press fit press machine and a retracted position separated from this press position, and which has a predetermined number of bolt-insertion holes into which bolts are press fitted into said hardware, bolt transfer mechanisms, and bolt temporarily-press fit mechanisms which insert and temporarily press fit the bolts from said bolt transfer mechanism in a corresponding manner with respect to said predetermined number of bolt-insertion holes.

2. The bolt press fit apparatus according to claim 1, wherein said hardware mounting members includes a fitting projection which loosely fits into a recess formed at a central portion of said hardware, and a flange receiving portion on which a flange of said hardware is placed.

3. The bolt press fit apparatus according to claim 1, wherein said bolt temporarily-press fit mechanism is provided with a guide for guiding the bolt from said bolt transfer mechanism, and a bolt holding portion for holding the bolt from the guide with a urging force of urging means from outside in a diametrical direction of said bolt temporarily-press, fit mechanism, and a guiding direction of said guide is inclined with respect to an axial direction of the bolt held by said bolt holding portion.

4. The bolt press fit apparatus according to claim 3, wherein said bolt temporarily-press fit mechanism includes a press and drive portion which presses the bolt held by said bolt holding portion to discharge the bolt from said bolt holding portion against the urging force of said urging means, and temporarily press fits the bolt in said bolt-insertion hole.

5. The bolt press fit apparatus according to claim 3, wherein said hardware mounting members functions as a support portion for supporting said hardware such that said hardware can rotated around its axis.

6. The bolt press fit apparatus according to claim 5, wherein said hardware mounting members includes a fitting projection which loosely fits into a recess formed at a central portion of said hardware, and a flange receiving portion on which a flange of said hardware is placed.

7. The bolt press fit apparatus according to claim 4, wherein said press and drive portion comprises a fluid pressure cylinder and a bolt-pressing rod connected to said fluid cylinder.

8. The bolt press fit apparatus according to claim 7, wherein said press and drive portion allows said pressing rod to function as a positioning rod for said hardware, and before the bolt from said bolt transfer mechanism is received in said bolt holding portion, said press and drive portion projects said pressing rod from said bolt holding portion, and inserts said pressing, rod into said bolt-insertion hole of said hardware on the side of said hardware mounting member so that said hardware can be positioned with respect to said bolt holding portion.

9. The bolt press fit apparatus according to claim 1, wherein said bolt transfer mechanism comprises a first transfer member for flowing said bolt downward through a transfer path by weight of said bolt, and a second transfer member for sending the bolt from said first transfer member under air pressure.

10. The bolt press fit apparatus according to claim 9, wherein said first transfer member comprises a first half transfer path through which the bolt flows down in its axial direction, and a latter half transfer path through which said bolt flows down in a state in which a head of said bolt is directed upward, and wherein said first transfer member is provided at its transfer end with a bolt-length detecting sensor for detecting whether said bolt has a predetermined length.

11. The bolt press fit apparatus according to claim 9, wherein said second transfer member includes a tube through which said bolt flows, and a compressor for supplying compressed air into said tube.

12. A bolt press fit apparatus for inserting bolts into hardware comprising:

a bolt supply portion for accommodating bolts, a bolt press fit press machine, hardware mounting members which can move between a press position of said bolt press fit press machine and a retracted position separated from this press position, and which has a predetermined number of bolt-insertion holes into which bolts are press fitted into said hardware, and a bolt transfer mechanism for transferring the bolt of said bolt supply portion to temporarily press fit mechanisms inserts and temporarily press fits the bolt from said bolt transfer mechanism in a corresponding manner with respect to said predetermined number of bolt-insertion holes.

13. The bolt press fit apparatus according to claim 12, wherein said bolt temporarily-press fit mechanism includes a hollow cylindrical bolt guide portion, a bolt holding portion and a press driving portion.

14. The bolt press fit apparatus according to claim 13, wherein said press and drive portion comprises a fluid pressure cylinder and a bolt-pressing rod connected to said fluid cylinder.

15. The bolt press fit apparatus according to claim 14, wherein said press and drive portion allows said pressing rod to function as a positioning rod for said hardware, and before the bolt from said bolt transfer mechanism is received in said bolt holding portion, said press and drive portion projects said pressing rod from said bolt holding portion, and inserts said pressing rod into said bolt-insertion hole of said hardware on the side of said hardware mounting member so that said hardware can be positioned with respect to said bolt holding portion.

* * * * *